US011317056B2

(12) United States Patent
Oyachi

(10) Patent No.: US 11,317,056 B2
(45) Date of Patent: Apr. 26, 2022

(54) COMMUNICATION APPARATUS AND METHOD AND STORAGE MEDIUM ENABLING DATA TO BE TRANSFERRED TO EXTERNAL APPARATUS USING PLURALITY OF TRANSFER METHODS

(71) Applicant: CANON KABUSHIKI KAISHA, Tokyo (JP)

(72) Inventor: Takahiko Oyachi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 257 days.

(21) Appl. No.: 16/851,891

(22) Filed: Apr. 17, 2020

(65) Prior Publication Data

US 2020/0344443 A1 Oct. 29, 2020

(30) Foreign Application Priority Data

Apr. 26, 2019 (JP) .............................. JP2019-085791

(51) Int. Cl.
*H04N 7/04* (2006.01)
*H04N 5/232* (2006.01)
*H04N 5/38* (2006.01)

(52) U.S. Cl.
CPC ......... *H04N 7/04* (2013.01); *H04N 5/232411* (2018.08); *H04N 5/38* (2013.01)

(58) Field of Classification Search
CPC ...... H04N 5/232411; H04N 5/38; H04N 5/77; H04N 5/772; H04N 7/04
See application file for complete search history.

(56) References Cited

U.S. PATENT DOCUMENTS

2018/0376397 A1* 12/2018 Maeda .................. H04W 36/36

FOREIGN PATENT DOCUMENTS

| JP | 2007004398 A |   | 1/2007 |
| JP | 2012147357 A | * | 8/2012 |
| JP | 2012147357 A |   | 8/2012 |

OTHER PUBLICATIONS

Machine English Translation of JP-2012147357-A, Aug. 2012 (Year: 2012).*

* cited by examiner

*Primary Examiner* — Nelson D. Hernández Hernández
(74) *Attorney, Agent, or Firm* — Carter, DeLuca & Farrell LLP

(57) ABSTRACT

A communication apparatus comprises: a first communication circuit and a second communication circuit configured to transfer data to an external apparatus using a different communication method; and a memory storing instructions which, when the instructions are executed by one or more processors, cause the communication apparatus to function as a control unit to manage a transfer state of each data to be transferred and to control the transfer of data to be transferred using the first communication circuit and the second communication circuit. The control unit controls data transfer using the second communication circuit according to whether the data transfer using the first communication circuit is successful or not and the data transfer using the second communication circuit is enabled or not.

17 Claims, 12 Drawing Sheets

FIG. 3A

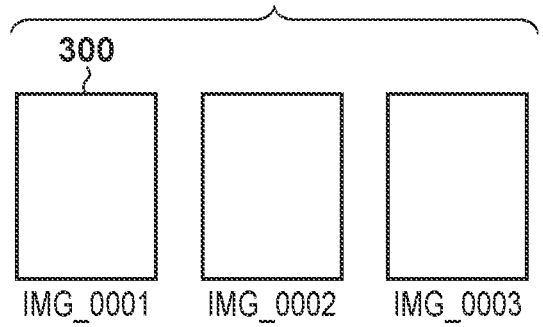

300

IMG_0001  IMG_0002  IMG_0003

301 FIG. 3B

TRANSFER MANAGEMENT LIST

IMG_0001:UNSELECTED
IMG_0002:UNSELECTED
IMG_0003:UNSELECTED

302 FIG. 3C

TRANSFER MANAGEMENT LIST

IMG_0001:BEING TRANSFERRED
(EXTERNAL APPARATUS A)
IMG_0002:UNSELECTED
IMG_0003:UNSELECTED

303 FIG. 3D

TRANSFER MANAGEMENT LIST

IMG_0001:TRANSFER COMPLETE
(EXTERNAL APPARATUS A)
IMG_0002:UNSELECTED
IMG_0003:UNSELECTED

304 FIG. 3E

TRANSFER MANAGEMENT LIST

IMG_0001:TRANSFER FAILED
(EXTERNAL APPARATUS A)
IMG_0002:UNSELECTED
IMG_0003:UNSELECTED

FIG. 4A

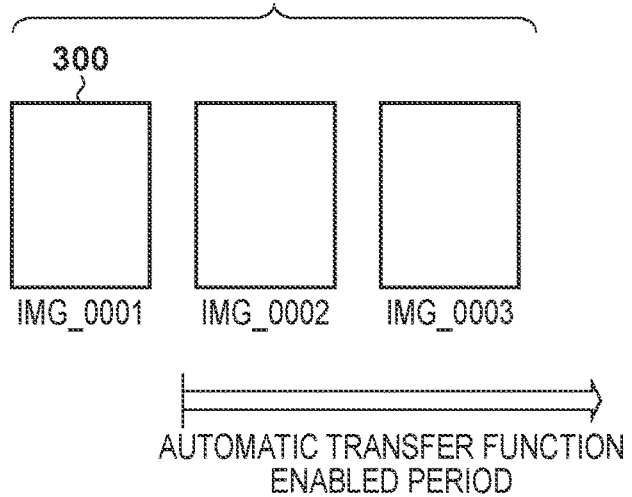

IMG_0001  IMG_0002  IMG_0003

AUTOMATIC TRANSFER FUNCTION ENABLED PERIOD

TRANSFER MANAGEMENT LIST

IMG_0001:UNSELECTED
IMG_0002:TRANSFER RESERVED
(EXTERNAL APPARATUS A)
IMG_0003:TRANSFER RESERVED
(EXTERNAL APPARATUS A)

TRANSFER MANAGEMENT LIST

IMG_0001:UNSELECTED
IMG_0002:BEING TRANSFERRED
(EXTERNAL APPARATUS A)
IMG_0003: TRANSFER RESERVED
(EXTERNAL APPARATUS A)

TRANSFER MANAGEMENT LIST

IMG_0001:UNSELECTED
IMG_0002:TRANSFER COMPLETE
(EXTERNAL APPARATUS A)
IMG_0003: BEING TRANSFERRED
(EXTERNAL APPARATUS A)

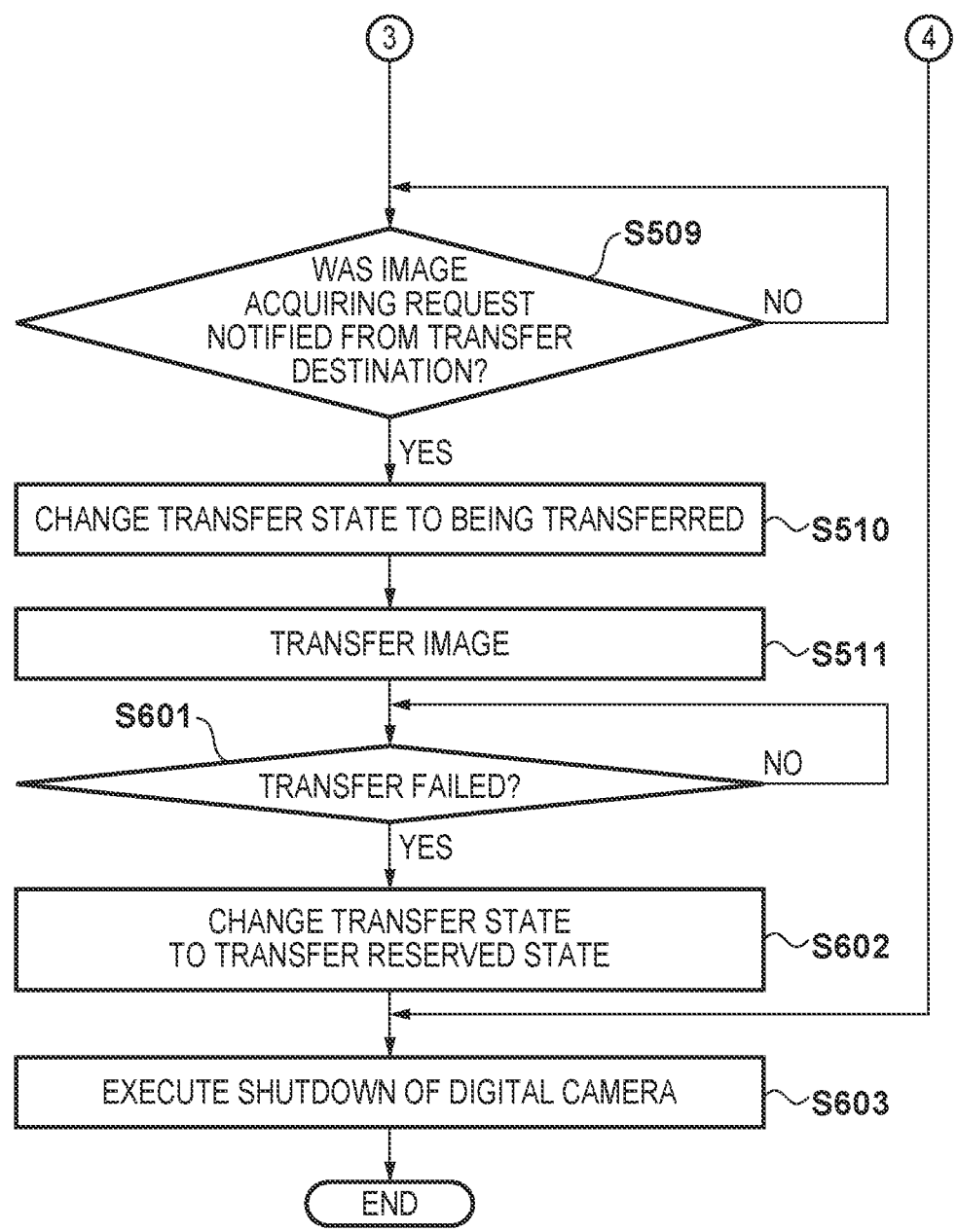

COMMUNICATION APPARATUS AND METHOD AND STORAGE MEDIUM ENABLING DATA TO BE TRANSFERRED TO EXTERNAL APPARATUS USING PLURALITY OF TRANSFER METHODS

BACKGROUND OF THE INVENTION

Field of the Invention

The present invention relates to a communication apparatus and method and a storage medium enabling data to be transferred to an external apparatus using a plurality of transfer methods.

Description of the Related Art

In recent years, various data transfer methods installed in apparatuses have been developed. While a user can transmit and receive data in an appropriate data transfer method compatible with an application or a purpose, the user may be required to understand a connection method for and characteristics of each communication, and may fail to transfer data as desired in a case where the user does not have sufficient knowledge.

In regard to such a problem, a technology is known that involves preventing mistaken transmission in data transmission and receiving, or even in a case where transmission of data fails, automatically retransmitting data to reduce loads on the user. Japanese Patent Laid-Open No. 2007-4398 discloses a technology for preventing mistaken transmission of data in a case where a device in a transfer reserved state is mistakenly connected to another output device. Japanese Patent Laid-Open No. 2012-147357 discloses a technology for retrying transfer in a case where the transfer fails.

However, an increasing number of apparatuses can handle a plurality of transfer methods in a single device. For transfer of predetermined data, in a case of having used one of a plurality of transfer methods and failed in transfer, the apparatus as described above can desirably transfer the predetermined data using another transfer method.

SUMMARY OF THE INVENTION

The present disclosure has been made in consideration of the aforementioned issues, and realizes a technology for an apparatus that enables data to be transferred to an external apparatus using a plurality of transfer methods, the technology enabling the predetermined data to be more reliably transferred to the external apparatus even in a case where transfer of the predetermined data using one of the transfer methods fails.

In order to solve the aforementioned problems, one aspect of the present disclosure provides a communication apparatus comprising: a first communication circuit configured to transfer data to an external apparatus using a first communication method; a second communication circuit configured to transfer data to the external apparatus using a second communication method; one or more processors; and a memory storing instructions which, when the instructions are executed by the one or more processors, cause the communication apparatus to function as: a setting unit configured to set enabling or disabling of data transfer using the second communication circuit; and a control unit configured to manage a transfer state of each data to be transferred and to control the transfer of the data to be transferred using the first communication circuit and the transfer of the data to be transferred using the second communication circuit, wherein the control unit controls to prevent the data to be transferred from being an object of subsequent data transfer in a case where the transfer of the data to be transferred using the first communication circuit is successful, and in a case where the transfer of data to be transferred using the first communication circuit fails, the control unit controls to prevent the data to be transferred from being an object of data transfer using the second communication circuit in a case where the data transfer using the second communication circuit is disabled, and the control unit controls to make the data to be transferred the object of data transfer using the second communication circuit in a case where the data transfer using the second communication circuit is enabled.

Another aspect of the present disclosure provides a method of controlling a communication apparatus that comprises a first communication circuit configured to transfer data to an external apparatus using a first communication method, and a second communication circuit configured to transfer data to the external apparatus using a second communication method, the method comprising: setting enabling or disabling of data transfer using the second communication circuit; and controlling to manage a transfer state of each data to be transferred and to control the transfer of the data to be transferred using the first communication circuit and the transfer of the data to be transferred using the second communication circuit, wherein the controlling includes controlling to prevent the data to be transferred from being an object of subsequent data transfer in a case where the transfer of the data to be transferred using the first communication circuit is successful, and in a case where the transfer of data to be transferred using the first communication circuit fails, controlling to prevent the data to be transferred from being an object of data transfer using the second communication circuit in a case where the data transfer using the second communication circuit is disabled, and controlling to make the data to be transferred the object of data transfer using the second communication circuit in a case where the data transfer using the second communication circuit is enabled.

Still another aspect of the present disclosure provides a non-transitory computer-readable storage medium storing instructions which, when the instructions are executed by one or more processors of a communication apparatus that comprises a first communication circuit configured to transfer data to an external apparatus using a first communication method, and a second communication circuit configured to transfer data to the external apparatus using a second communication method, cause the communication apparatus to perform: setting enabling or disabling of data transfer using the second communication circuit; and controlling to manage a transfer state of each data to be transferred and to control the transfer of the data to be transferred using the first communication circuit and the transfer of the data to be transferred using the second communication circuit, wherein the controlling includes controlling to prevent the data to be transferred from being an object of subsequent data transfer in a case where the transfer of the data to be transferred using the first communication circuit is successful, and in a case where the transfer of data to be transferred using the first communication circuit fails, controlling to prevent the data to be transferred from being an object of data transfer using the second communication circuit in a case where the data transfer using the second communication circuit is disabled, and controlling to make the data to be transferred the object of data transfer using the second communication circuit in a case where the data transfer using the second communication circuit is enabled.

According to the present invention, in the apparatus enabling the data to be transferred to the external apparatus using the plurality of transfer methods, the predetermined data can be more reliably transferred to the external apparatus even in a case where transfer of the predetermined data using one of the transfer methods fails.

Further features of the present invention will become apparent from the following description of exemplary embodiments (with reference to the attached drawings).

BRIEF DESCRIPTION OF THE DRAWINGS

FIGS. 3A to 3E are diagrams illustrating an example of a transfer management list used in a case where an image is transferred in response to a user instruction.

FIGS. 4A to 4D are diagrams illustrating an example of a transfer management list used in a case where an image is automatically transferred at the time of power-OFF of the digital camera.

FIGS. 6A and 6B are flowcharts illustrating operations performed in a case where the transfer fails in the automatic image transfer processing according to the present embodiment.

DESCRIPTION OF THE EMBODIMENTS

Figure 1A:
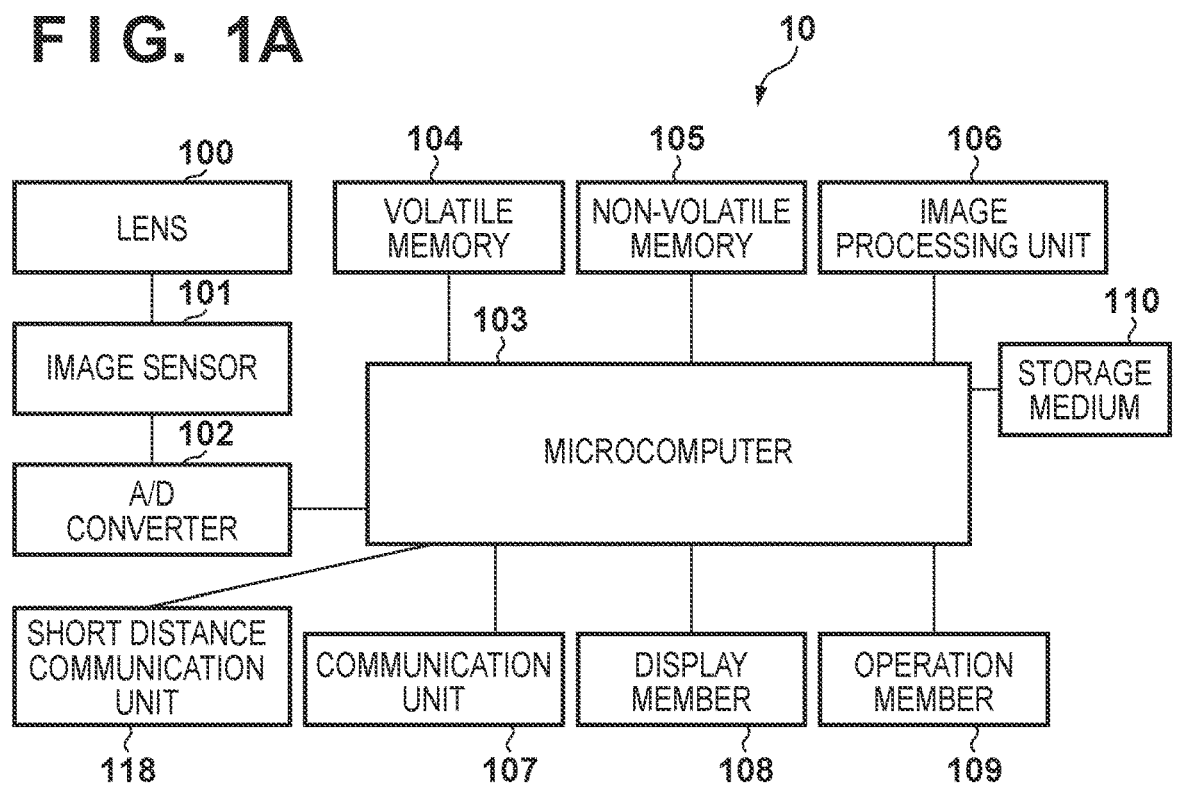
FIGS. 1A and 1B are block diagrams illustrating an example of a functional configuration of a digital camera as an example of a communication apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Additionally, an example will be described below in which a digital camera that can transfer image data to an external apparatus using a plurality of different transfer methods is used as an example of a communication apparatus. However, the present embodiment is not limited to digital cameras, and can also be applied to other devices that can transfer data to an external apparatus using a plurality of transfer methods. These devices may include, for example, personal computers, mobile phones including smartphones, game machines, tablet terminals, watch-type or eyeglass-type information terminals, medical devices, and devices for monitoring systems or automotive systems. Additionally, data related to transfer is not limited to image data, and can also be applied to other data such as voice data, user content data generated by the user, and sensor data collected by sensors of the device.

Configuration of Digital Camera

First, an example of a functional configuration of a digital camera 10 according to the present embodiment will be described with reference to FIG. 1A. A lens 100 is, for example, an image capturing lens constituting an image-capturing optical system, and the image capturing lens includes, for example, a fixed focal length lens or a zoom lens. Note that in the configuration illustrated in FIGS. 1A and 1B, an example is illustrated in which the lens 100 is included in the digital camera 10 but that the lens 100 may be detachable or may be a configuration that is not included in the digital camera 10. The configuration of the digital camera 10 except for the lens 100 is also referred to as a camera main body.

An image sensor 101 includes, for example, a CCD or CMOS sensor, and converts, into an analog electric signal, a subject image formed by the lens 100. An A/D converter 102 converts, into a digital signal, the analog electric signal output from the image sensor 101. A control unit 103 includes one or more processors, for example, a CPU, and expands, into a volatile memory 104, a program stored in a non-volatile memory 105, and executes the program to control each component of the digital camera, data processing, and the like, thus controlling overall operations. For example, the control unit 103 performs control for which an operation instruction is received from an operation member 109, generation and playback of images to be displayed on a display member 108, network control via a communication unit 107 and a short distance communication unit 118, and the like. Additionally, as described below, the control unit 103 executes transfer management processing on images, such as selection of an image to be transferred, transfer execution, transfer completion, and transfer reservation. The control unit 103 executes transfer list management processing used in such control, management of continuously captured images as related images, and the like.

Furthermore, the control unit 103 controls a sequence of operations performed in a case where a still image is captured. In a case of detecting that an image capturing instruction button 116 has been depressed, the control unit 103 starts a sequence of operations for still image capturing, and controls quick review display for checking the captured image by the user, or controls writing to a storage medium 110. A volatile memory 104 is constituted by a volatile semiconductor memory, for example, a DRAM and the like, and temporarily holds image data converted to a digital signal by the A/D converter 102. The non-volatile memory 105 is constituted by a non-volatile semiconductor memory such as an EEPROM, and stores programs to be processed by the control unit 103, various types of setting information for the digital camera, and the like.

An image processing unit 106 executes image processing on a captured image. In addition, the image processing unit 106 cooperates with the control unit 103 to generate a live view image for checking composition and focus in a case of image capturing. Note that the control unit 103 may be configured to encompass the functions of the image processing unit 106 to execute the processing of the image processing unit 106 instead.

A communication unit 107 is a communication circuit or a communication module that can perform communication conforming to standards, for example, radio LAN and the like. For a communication technology, wired connection as well as wireless connection may be used. In the present embodiment, a case in which data is transferred to an external apparatus in accordance with a Wi-Fi (trademark) communication scheme will be described as an example, but no such limitation on the communication scheme is intended. The short distance communication unit 118 is a communication circuit or communication module using a communication scheme that is different from the communication scheme used by the communication unit 107 and that enables power-saving communication, for example, Bluetooth (trademark) and the like. The communication scheme used by the short distance communication unit 118 involves a shorter communicable distance and more power saving than the communication scheme used by the communication unit 107. Additionally, the communication scheme used by the communication unit 107 enables faster communication than the communication scheme used by the short distance communication unit 118.

The display member 108 displays menus for operation of the digital camera, playback images, live view images, and the like in response to the control of the control unit 103. Selection of an image to be transferred as described below is performed via the display member 108 and the operation member 109.

The operation member 109 includes an operation member including, for example, buttons, switches, and dials and the like, as well as a touch panel implemented in combination with the display member 108. The operation member 109 receives a user operation, and notifies the control unit 103 of information indicating the user operation.

The storage medium 110 includes a removable storage medium, for example, a compact flash (trademark) or an SD card and the like, as well as a storage medium such as an HDD or an SSD. The control unit 103 controls processing of writing data from the volatile memory 104 into the storage medium 110 and processing of reading, into the volatile memory 104, data stored in the storage medium 110.

Figure 1B:
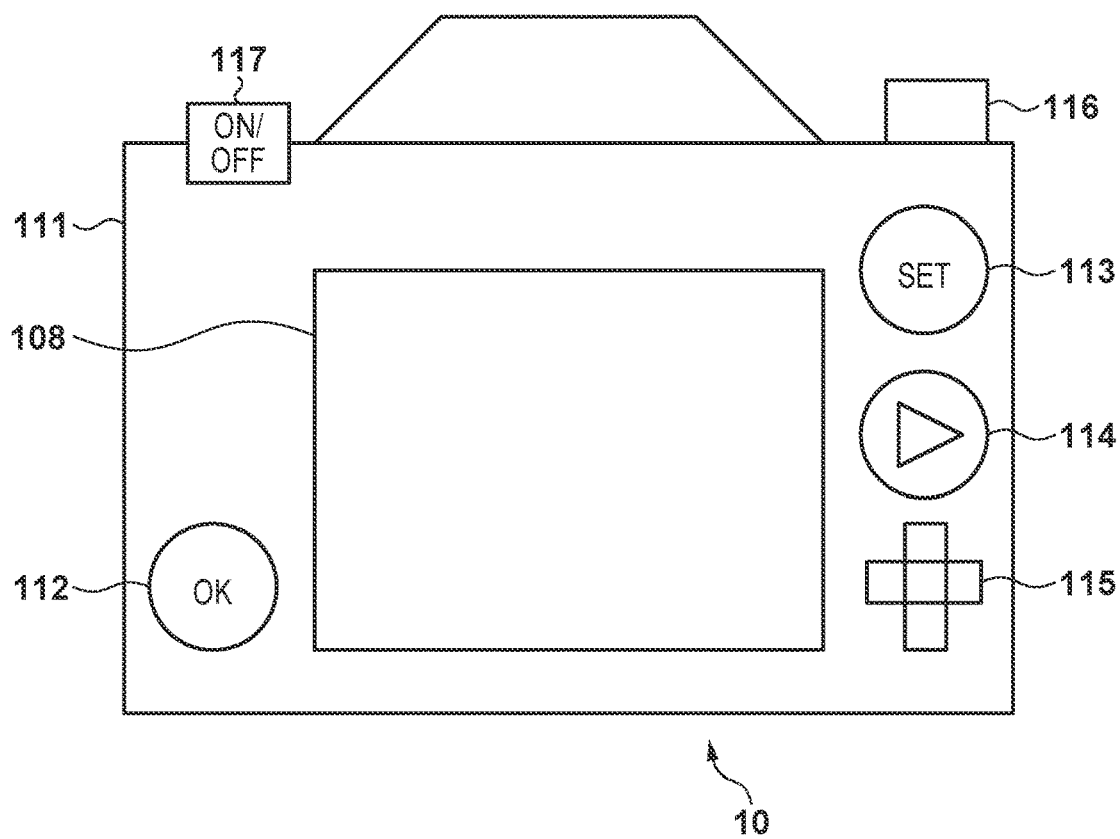

FIG. 1B illustrates an example of appearance and configuration of a back side of the digital camera 10. The camera main body 111 is a main body of a digital camera. Each of 112 to 116 illustrated in FIG. 1B is a button or a switch constituting a part of the operation member 109. An OK button 112 is an example of a button for a user to instruct determination of an input content or an operation content. The OK button 112 is used for an operation of executing certain processing, for example, deletion of an image and the like, only after confirming with the user. A set button 113 is used for an operation of determining an item selected from a menu. In a case of detecting that a playback button 114 is depressed, the control unit 103 reads out an image stored in the storage medium 110, temporarily holds the image in the volatile memory 104, and displays the image on the display member 108. A multi-controller 115 is used to receive, via a menu displayed on the display member 108, an up/down/right/left instruction and an operation instruction such as for image feeding being played back, the instructions being given by the user. An image capturing instruction button 116 includes a first shutter switch and a second shutter switch, and receives an image capturing instruction from the user. The first shutter switch is turned ON halfway through the operation of the image capturing instruction button 116 provided in the digital camera, that is, in the state of what is called half-depression (image capturing preparation instruction), and generates a first shutter switch signal. In response to the first shutter switch signal, the control unit 103 starts operations for autofocus (AF) processing, automatic exposure (AE) processing, auto white balance (AWB) processing, flash preliminary emission (EF) processing, and the like. The second shutter switch is turned ON in a case where the operation of the image capturing instruction button 116 is completed, that is, in the state of what is called full-depression (image capturing instruction), and generates a second shutter switch signal. In response to the second shutter switch, the control unit 103 starts a sequence of operations for image capturing processing from reading of a signal from the image sensor 101 to writing of image data to the storage medium 110. A power supply button 117 is a switch constituted by, for example, a power supply lever or a power supply button, to start the supply of power to the digital camera or to stop providing power, in response to a user operation. The shape of the power supply button 117 is not particularly limited.

Example of Configuration of Image Capturing System

Figure 2:
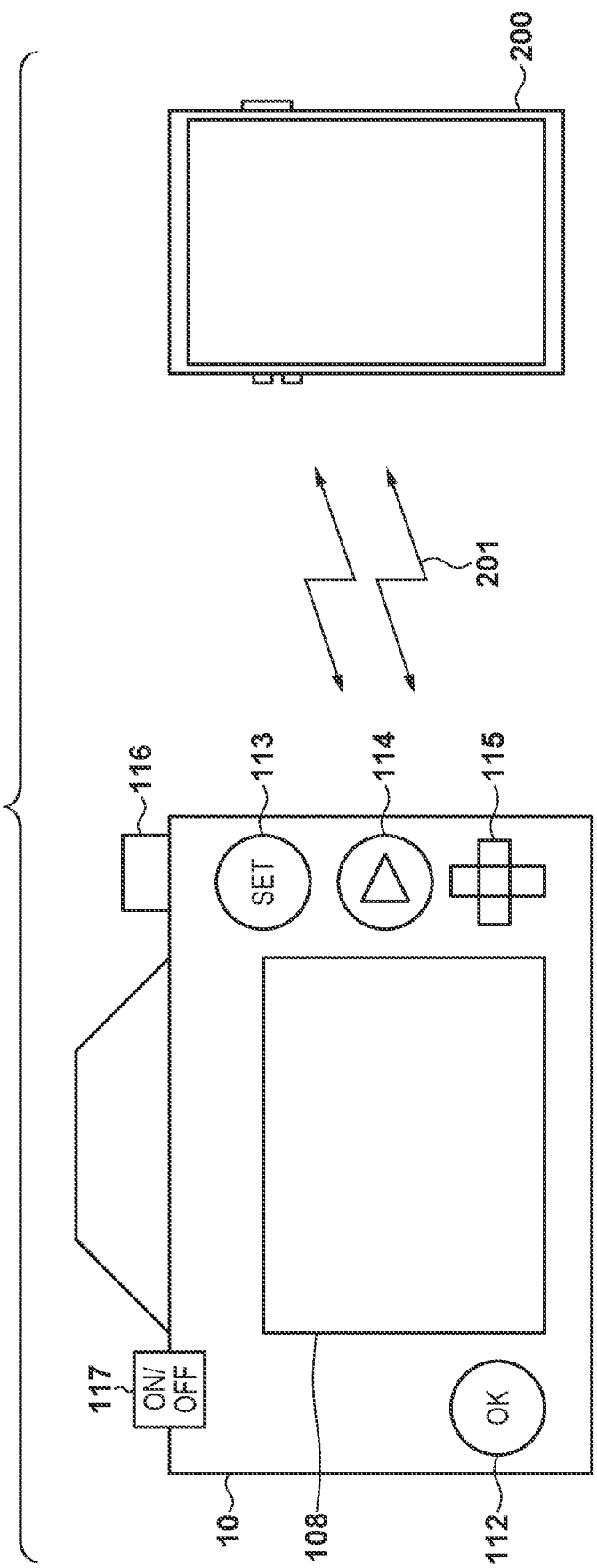
FIG. 2 is a diagram illustrating an example of a configuration of an image capturing system according to the present embodiment.

Now, the image capturing system according to the present embodiment will be described with reference to FIG. 2. The image capturing system is constituted by the digital camera 10 and an external apparatus 200, and the digital camera 10 and the external apparatus 200 can communicate via a network. The external apparatus 200 is an external apparatus to which images are to be transferred, and receives images transferred from the digital camera 10. The external apparatus 200 is, for example, a personal computer or a smartphone and the like, and can be applied to the present embodiment as long as the external apparatus 200 includes a communication function. A transfer path 201 may be a wired or wireless communication path, for which the communication technology is not particularly limited, but a plurality of communication paths are assumed that comply with communication schemes, for example, Wi-Fi (trademark) and Bluetooth (trademark) and the like. The image capturing system implements, for example, a function of manually selecting and transmitting, to the external apparatus 200, an image captured by the digital camera 10, and a function of transferring the image to the external apparatus 200 using Bluetooth (trademark) in a case where the digital camera 10 is turned off.

Transfer Management List

Now, with reference to FIGS. 3A to 3E, management of a transfer list in processing (manual image transfer processing) in which the digital camera 10 uses a user operation as a trigger to transfer a captured image to the external apparatus 200 will be described. In the example illustrated in FIGS. 3A to 3E, the user selects a captured image and instructs image transfer to the external apparatus 200.

FIG. 3A schematically illustrates an image 300 stored in the storage medium 110. The example illustrates that three images IMG_0001, IMG_0002, IMG_0003 are recorded in the storage medium 110. The transfer management list illustrated in FIGS. 3B to 3E is a list for identifying a transfer state and a transfer destination of each of the images captured and recorded in the storage medium 110. For example, in a case where an image has been transferred to the external apparatus 200 (also referred to as the external apparatus A), the transfer state (and transfer destination) is described as "transfer complete" or "transfer to external apparatus A complete" and the like. The transfer state includes states of unselected, transfer complete, transfer failed, and image being transferred, and may include states of transfer being prepared, uncompleted, suspended, reserved, and the like. An initial value of the transfer state is, for example, an "unselected" state. Here, in a case where the transfer state is set to "transfer complete" or "transfer failed", the image is not the object of the subsequent data transfer in compliance with Wi-Fi (trademark) or Bluetooth (trademark). Note that in the example described above assumes the transfer management list stored in the storage medium 110 but that, with the storage medium 110 held in the non-volatile memory 105, the transfer management list may be read into the volatile memory 104 for use only in a case where the transfer management list is used. Note that, in the described example, the transfer management list illustrated in FIGS. 3B to 3E indicates the transfer state and the transfer destination apparatus but that the transfer management list may exclusively describe the image and the transfer state. Additionally, in a case where the transfer destination apparatus is described, a method for describing the transfer destination apparatus is not limited to the example illustrated in FIGS. 3A to 3E as long as the transfer destination apparatus is identified.

FIG. 3B illustrates that the transfer management state of each image has an initial value, in other words, corresponds to the unselected state. At this time, in a case where the user selects an image and gives a transfer start instruction while the digital camera 10 can communicate with the external apparatus 200 by Wi-Fi (trademark), the digital camera 10 controls the transfer management list as in 302 illustrated in FIG. 3C. The transfer management list represents a state in which an instruction for transmission to the external apparatus is being executed on the IMG_0001 image, and the transfer state has been changed to "image being transferred". For example, in a case of completing retrieval of the image (IMG_0001), the external apparatus notifies the digital camera 10 of a transfer completion notification. In response to the notification, the digital camera 10 controls the transfer management list to a state at 303 illustrated in FIG. 3D. The transfer of IMG_0001 is complete, and thus the transfer state of IMG_0001 is the "transfer complete" state. On the other hand, in a case where, for example, the wireless function is disconnected during transfer of IMG_0001, the digital camera 10 detects a communication error to control the transfer management list to a state at 304 illustrated in FIG. 3E, that is, "transfer failed". In other words, the transfer state is changed to indicate that the transfer of IMG_0001 has failed.

The control of the transfer management list has been described above that is executed in a case where the user selects one image and gives a transmission instruction, with the transfer state of the image being changed to image being transferred, transfer complete, and transfer failed. However, the user can also select a plurality of images in advance. In such a case, a transfer completion list may be updated each time each image is transferred and the transfer is complete. The information of the transfer management list may be stored in the non-volatile memory 105 or the storage medium 110, and expanded into the volatile memory 104 and processed by the control unit 103 in a case where the information is used.

FIGS. 4A to 4D illustrate image transfer management in processing (automatic image transfer processing) in which the image is automatically transferred using Bluetooth (trademark) in a case where the digital camera 10 is powered OFF. Specifically, FIGS. 4A to 4D illustrate image transfer management in which the digital camera 10 uses, as a trigger, a predetermined event (power OFF) that is not a transmission instruction by the user via a menu operation to transfer the image to the external apparatus 200 through a communication path (Bluetooth (trademark)) different from Wi-Fi (trademark).

FIG. 4A schematically illustrates an image 300 stored in the storage medium 110. Note that the example in FIGS. 4A to 4E illustrates both a case where an image is captured with the automatic image transfer function in the power OFF state enabled in the menu of the digital camera 10, and a case where an image is captured with the function disabled. In the example illustrated in FIG. 4A, IMG_0001 represents an image captured in a case where the automatic image transfer function in the power OFF state is not enabled. On the other hand, IMG_0002 and IMG_0003 represent images captured in a case where the automatic image transfer function in the power OFF state is enabled.

As illustrated in FIG. 4B, the transfer management list changes to, for example, a state at 401 in a case where capturing of each image ends. Specifically, the transfer state of IMG_0001 is the unselected state, and the transfer states of IMG_0002 and IMG_0003 are the "transfer reserved" state. Here, the automatic image transfer function in the power OFF state will be described. With this function, in a case where the transfer state of a certain image is the transfer reserved state and with the automatic image transfer function set enabled, the digital camera 10 is powered OFF, the image is transferred to the external apparatus connected through Bluetooth (registered trademark) communication. Specifically, an image with the transfer state set to "transfer reserved" is the object of the data transfer using the Bluetooth (trademark) communication in a case where the automatic image transfer function is set enabled. In a case where the present function is performed, the external apparatus 200 notifies the digital camera 10 of an image acquiring request. For example, in a case where IMG_0002 is acquired, the transfer state of IMG_0002 is controlled to the image being transferred state as illustrated at 402. In addition, in a case where the transfer of IMG_0002 is complete, the transfer state of IMG_0002 is controlled to the transfer complete state, as illustrated at 403. Subsequently, the external apparatus attempts to acquire IMG_0003 as illustrated at 403, and thus the transfer management state of IMG_0003 is changed to image being transferred in a case where the image transfer starts.

Sequence of Operations Related to Automatic Image Transfer Processing

Now, a sequence of operations related to the automatic image transfer processing in the digital camera 10 will be described with reference to FIGS. 5A and 5B. Note that the present processing is implemented by the control unit 103 by expanding, into a work area of the volatile memory 104, a program stored in the non-volatile memory 105 and executing the program to control the units of the digital camera 10. In addition, the present processing starts in a case where what is called full-depression is performed on the image capturing instruction button 116 of the operation member 109.

At a step S500, the control unit 103 controls the image sensor 101 and the like to perform image capturing, and records, in the storage medium 110, an image signal including a subject.

At a step S501, the control unit 103 determines whether the automatic image transfer function is set enabled. For example, the control unit 103 references set values stored in the non-volatile memory 105 to determine whether the automatic image transfer function is set enabled. Note that the set value is stored in the non-volatile memory 105 in response to user operation of the operation member 109 in advance by the control unit 103. In a case of determining that the setting related to the automatic image transfer function indicates disabled, the control unit 103 returns the processing to the step S500. On the other hand, in a case of determining that the setting related to the automatic image transfer function indicates enabled, the control unit 103 proceeds to a step S502. At this time, in the transfer management list, the transfer state of the image captured at the step S501 is set to "unselected" corresponding to the initial state.

At the step S502, the control unit 103 changes the transfer state of the captured image (for example, the "unselected" state) to the "transfer reserved" state. At a step S503, the control unit 103 determines whether a user operation of powering OFF the digital camera 10 has been received. In a case of determining that the user operation of powering OFF the digital camera 10 has been input, based on operation information from the operation member 109, the control unit 103 proceeds to a step S504, and otherwise returns to the step S500 and continues image capturing to repeat the above-described processing. At a step S504, the control unit 103 determines whether or not the connection to the external apparatus using Bluetooth (trademark) communication (also simply referred to as BLT communication) is maintained. In a case of determining that the BLT communication is connected, the control unit 103 proceeds to a step S505 and otherwise proceeds to a step S515 (and shuts down the digital camera 10 at the step S515).

At the step S505, the control unit 103 checks the transfer management list. More specifically, with reference to the transfer management list read into the volatile memory 104, the transfer state of each image described in the transfer management list is checked. At a step S506, the control unit 103 checks the transfer management list to determine whether the transfer states of the images include the "transfer reserved" state. In a case where "transfer reserved" is set as the transfer state of the image, the control unit 103 proceeds to a step S507, and otherwise proceeds to the step S515.

At the step S507, the control unit 103 creates a list of transfer reserved files. Then, at a step S508, the control unit 103 uses the BLT communication to transmit, to the connected transfer destination (for example, the external apparatus 200), a list of files (images) corresponding to the object of "transfer reserved". The external apparatus 200 can recognize that a file to be transferred is present in the digital camera 10 at this stage. The external apparatus, in response to receiving the list, makes a request for image acquisition from the digital camera 10 (using the BLT communication). In this case, the external apparatus 200 may transmit one acquiring request for each image file, or designate a plurality of image files requested in the information of one acquiring request.

The control unit 103 is in a state waiting for the image acquiring request to be notified from the external apparatus 200. At a step S509, the control unit 103 determines whether the image acquiring request has been notified from the external apparatus 200. In a case of determining that the image acquisition information has been received, based on the notification from the short distance communication unit 118, the control unit 103 proceeds to a step S510, and otherwise repeats the processing at the step S509.

At the step S510, the control unit 103 changes the transfer state in the transfer management list to "image being transferred" for the image for which the acquiring request has been received from the external apparatus 200. At a step S511, the control unit 103 uses the BLT communication to transfer, to the external apparatus 200, the image designated in the image acquiring request received at the step S509.

At a step S512, the control unit 103 determines whether the transfer completion notification has been notified from the external apparatus 200. For example, in a state waiting for image transfer completion from external apparatus 200, the control unit 103 determines whether the transfer completion notification has been notified from the external apparatus 200 based on information from the short distance communication unit 118. In a case of determining that the transfer completion notification has been received, the control unit 103 proceeds to a step S513, and otherwise returns to the step S512 to repeat the processing.

At the step S513, the control unit 103 changes the transfer state of the designated image in the transfer management list to "transfer complete." At a step S514, the control unit 103 determines whether the transfer of all the transfer reserved files is ended. In a case of determining that there is any image that has been not transferred, the control unit 103 returns the processing to the step S509 and repeats the processing. On the other hand, in a case of determining that all the transfer reserved files have been transferred, the control unit 103 proceeds to the step S515. At the step S515, the control unit 103 performs shutdown processing of the digital camera 10, and then ends the sequence of operations of the present processing.

Figure 5A:
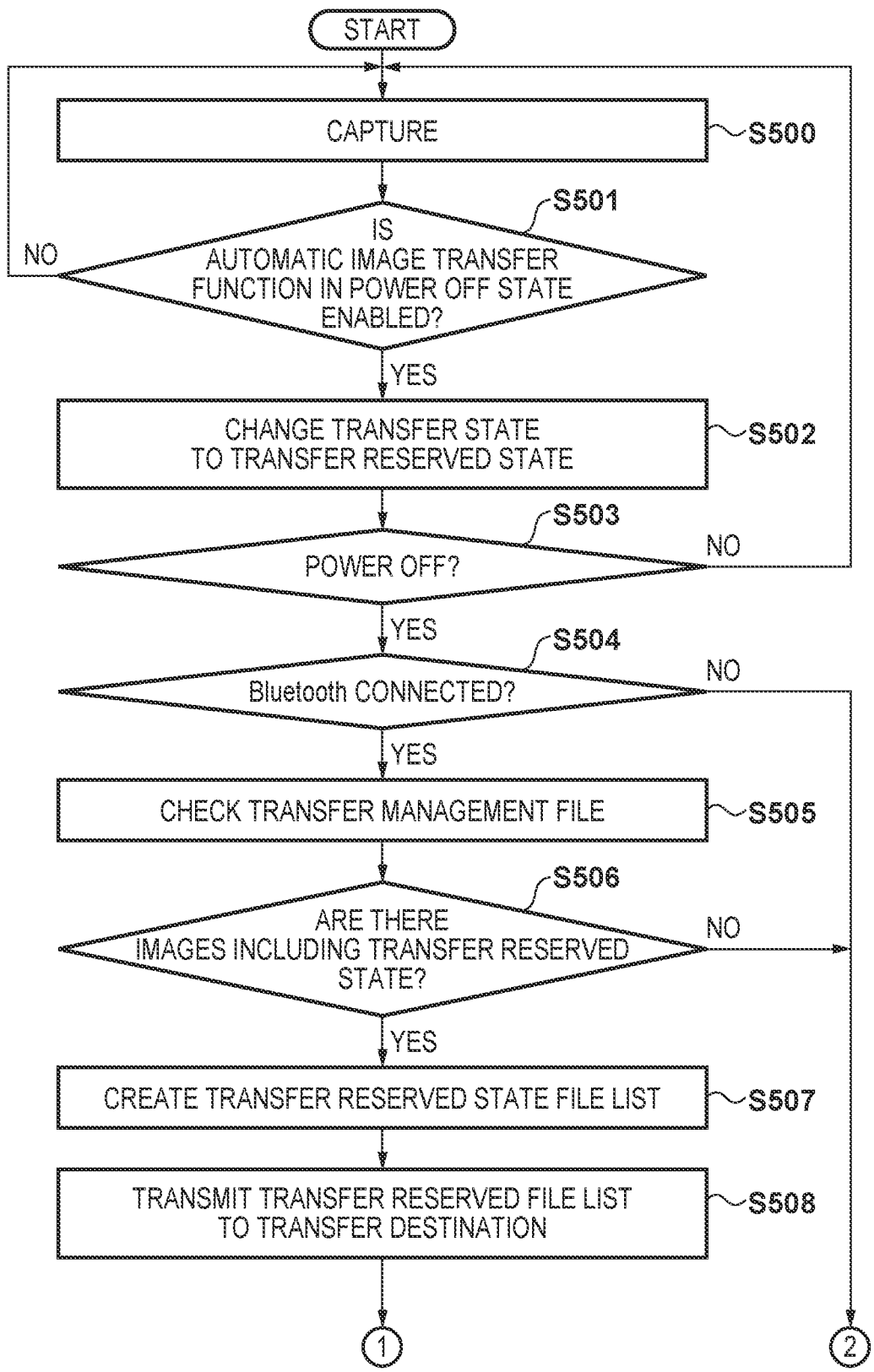
FIGS. 5A and 5B are flowcharts illustrating a sequence of operations for automatic image transfer processing according to the present embodiment.
Figure 5B:
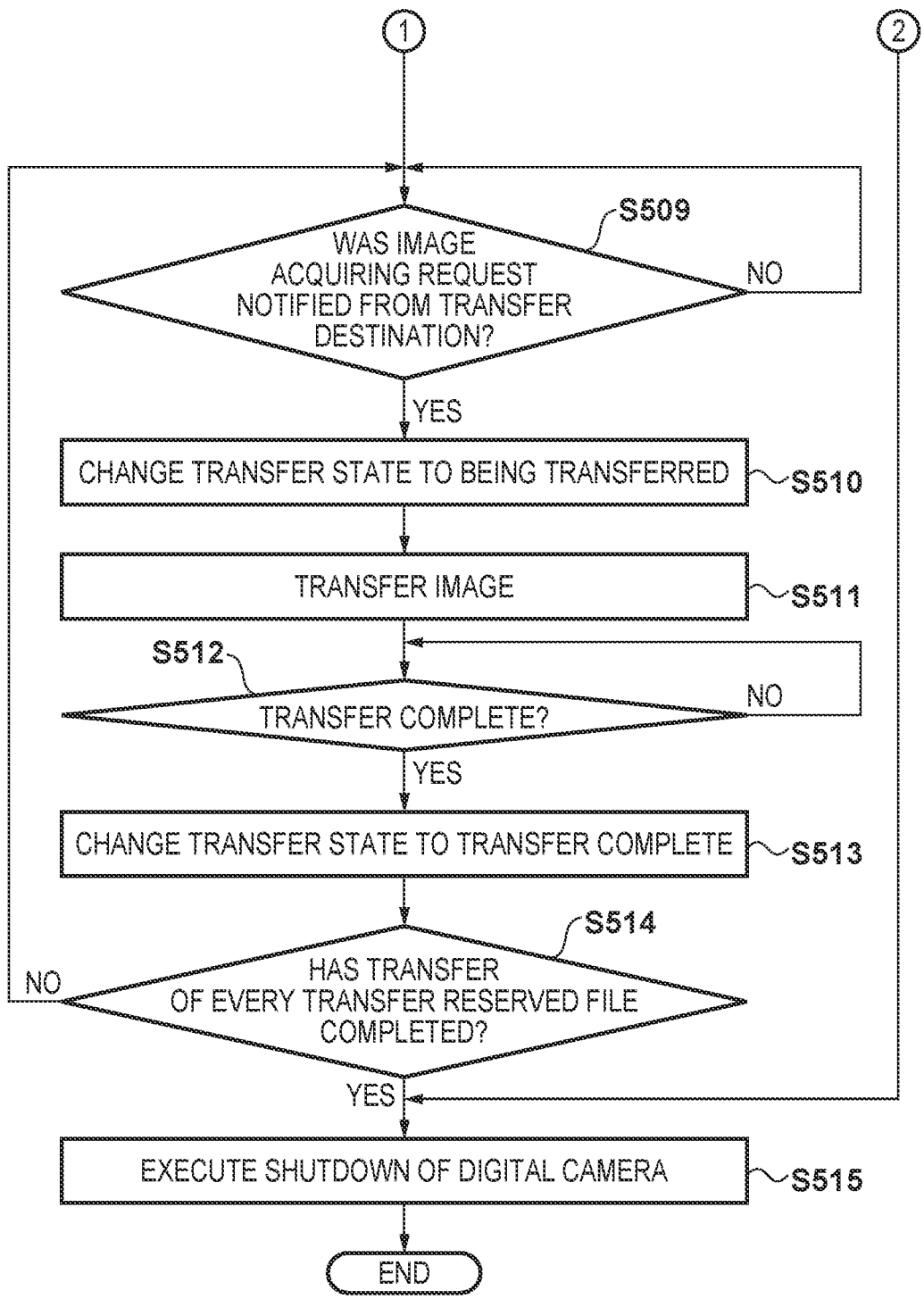
Figure 6A:
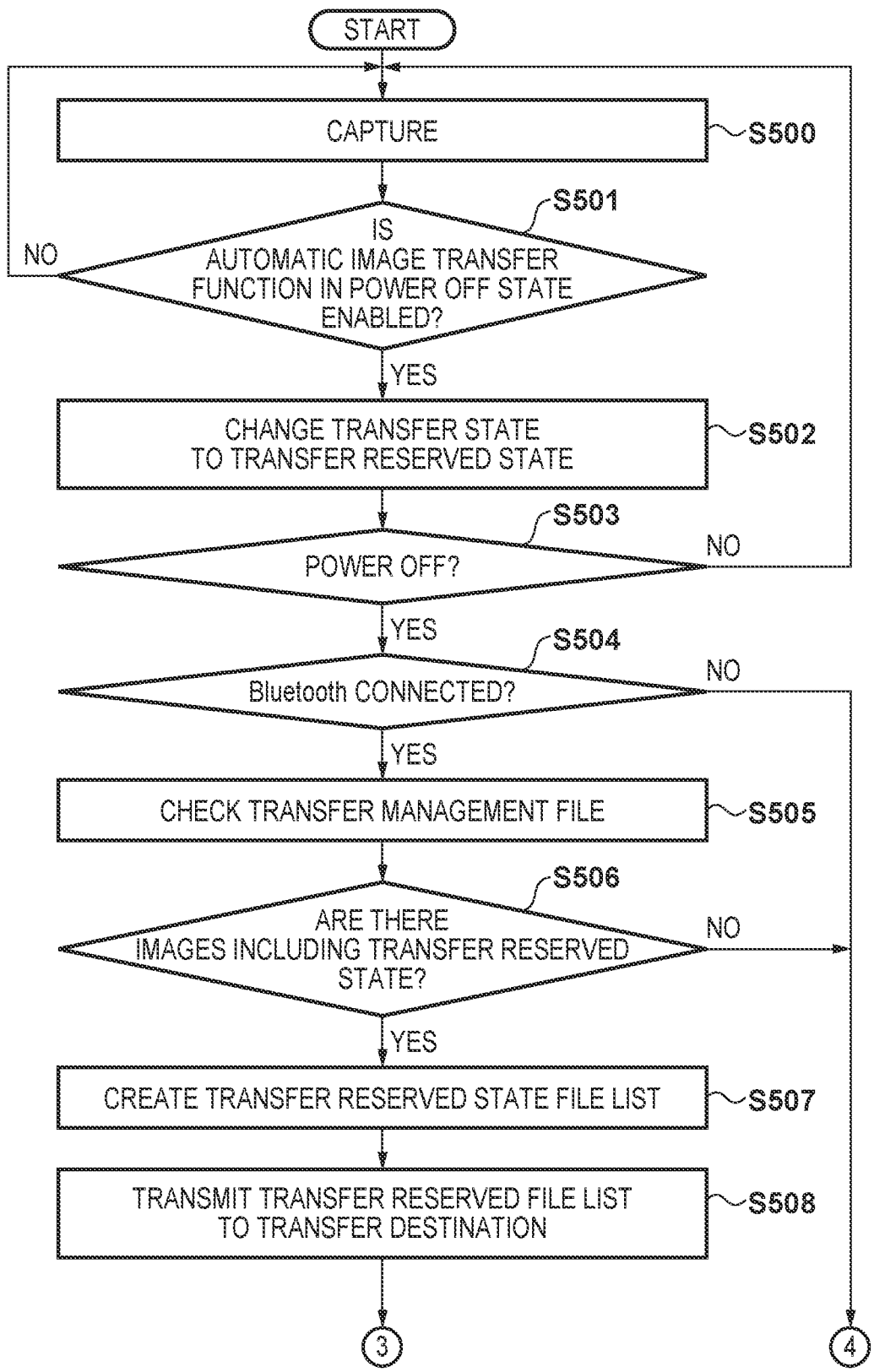

The automatic image transfer processing illustrated in FIGS. 5A and 5B are an example of processing in a case where the image is transferred normally, and an example of processing in a case where the transfer fails will be described with reference to a flowchart in FIGS. 6A and 6B. Note that the processing from the step S500 to the step S511 (processing until the image is transferred) illustrated in FIGS. 6A and 6B are the same as the corresponding processing in FIGS. 5A and 5B, and the control unit 103 executes each of the steps S500 to S511 to perform transfer (of the designated image) to the external apparatus 200.

At a step S601, the control unit 103 determines whether the image transmission has failed. In a case where the BLT communication with the external apparatus 200 is disconnected, the control unit 103 determines that the image transfer has failed. Alternatively, the image transfer may be determined to have failed in a case where the transfer completion notification is not notified from the external apparatus 200 even though a predetermined amount of time has elapsed. In a case of determining that the image transmission has failed, the control unit 103 returns the processing to the step S511, and otherwise proceeds to a step S602.

At the step S602, the control unit 103 returns the transfer state of the image with the failed transfer in the transfer management list to the "transfer reserved" state. In the present processing, the automatic image transfer function is set, and thus in a case where the image transfer has failed, the state is set to "transfer reserved" instead of "transfer failed". In a case where the image transfer state is set to "transfer failed", the image is not the object of transmission in the BLT communication. However, in a case of using the automatic image transfer function, the control unit 103 controls the transfer state to make the image with the failed transfer the object of retransmission by BLT. Specifically, by resetting the transfer state of the image to the "transfer reserved," the automatic image transfer processing can be executed again at the time of the next power-OFF of the digital camera 10 to retry the transfer. At a step S603, the control unit 103 executes the shutdown processing of the digital camera 10, and then ends the sequence of operations related to the present processing.

Sequence of Operations Related to Manual Image Transfer Processing

Figure 7:
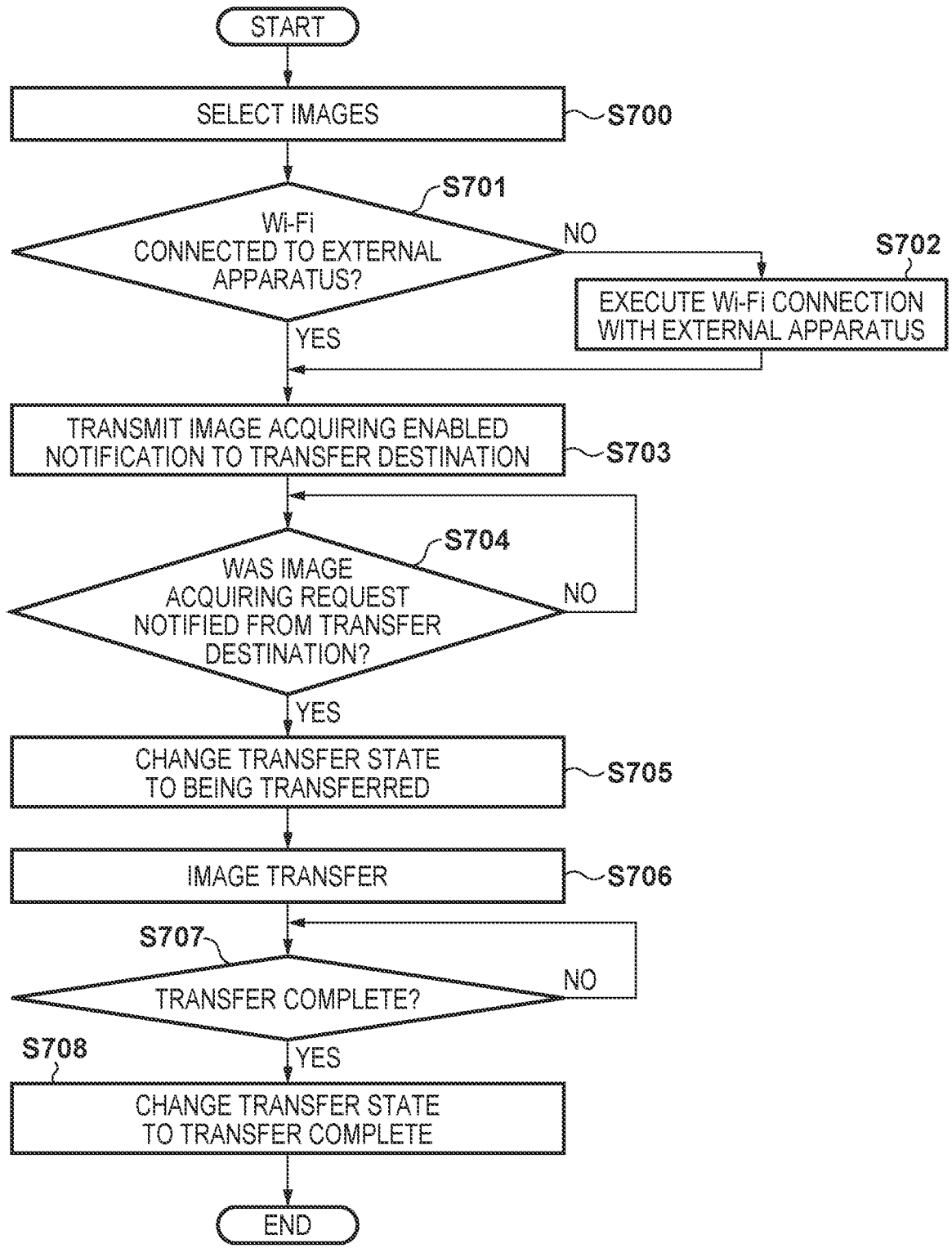
FIG. 7 is a flowchart illustrating a sequence of operations for manual image transfer processing according to the present embodiment.

Now, with reference to FIG. 7, a sequence of operations will be described that are performed in a case where one of the captured images is selected and manually transferred to the external apparatus 200 using Wi-Fi (trademark). Note that the present processing is implemented by the control unit 103 by expanding, into the work area of the volatile memory 104, a program stored in the non-volatile memory 105 and executing the program to control the units of the digital camera 10.

At a step S700, the control unit 103 selects from the captured images stored in the storage medium 110 in accordance with the user operation instruction received via the operation member 109. At a step S701, the control unit 103 determines whether the external apparatus 200 and the digital camera 10 are connected by Wi-Fi (trademark) via the communication unit 107. In a case of determining that communication based on Wi-Fi (trademark) is not established, the control unit 103 proceeds to a step S702, and otherwise proceeds to a step S703.

At the step S702, the control unit 103 uses the communication unit 107 to make a Wi-Fi (trademark) connection between the external apparatus 200 and the digital camera 10. At the step S703, the control unit 103 transmits an image acquiring enabled notification to the external apparatus 200 via the communication unit 107. In a case of receiving the notification, the external apparatus 200 can determine that an image to be received is present in the digital camera 10. The external apparatus 200 transmits an image acquiring request to the digital camera 10 in response to receiving the image acquiring enabled notification.

The digital camera 10 is in a state waiting for the image acquiring request to be notified from the external apparatus 200. In this case, at a step S704, the control unit 103 determines whether the image acquiring request has been received from the external apparatus 200 in response to the notification from the communication unit 107.

At a step S705, the control unit 103 changes, to "image being transferred," the transfer state of the image in the transfer management list that has been designated at the step S700. Furthermore, at a step S706, the control unit 103 transfers the image corresponding to the object of the image acquiring request described above to the external apparatus 200. At a step S707, the control unit 103 determines whether the image transfer is complete, and in a case of determining that the image transfer is complete, proceeds to a step S708. On the other hand, in a case of determining that the image transfer is not complete, the control unit 103 returns to the step S707. At the step S708, the control unit 103 changes the transfer state of the transferred image to "transfer complete", and then ends the sequence of operations related to the present processing.

Figure 8:
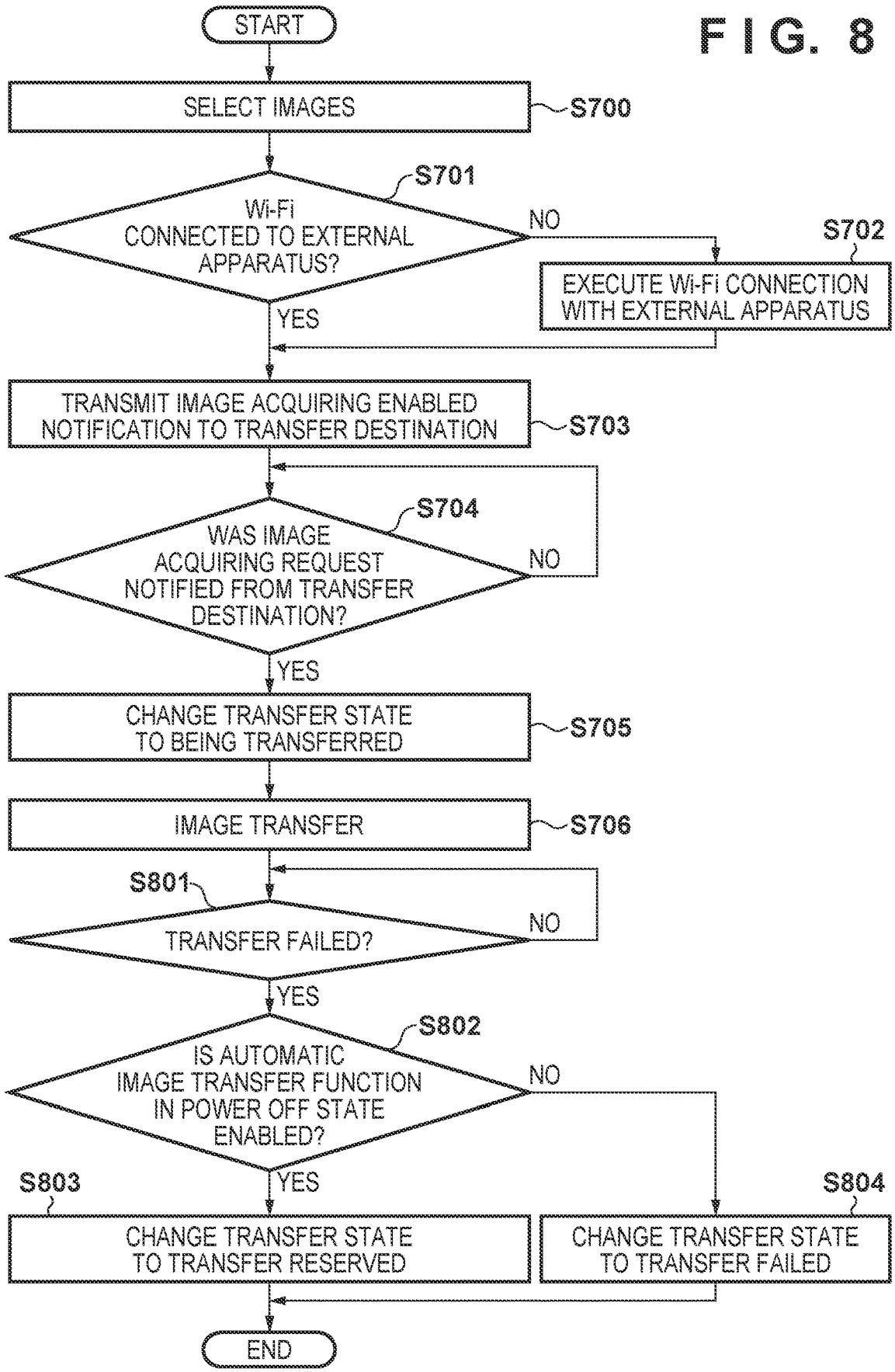
FIG. 8 is a flowchart illustrating operations performed in a case where the transfer fails in the manual image transfer processing according to the present embodiment.

Furthermore, with reference to FIG. 8, processing will be described that is executed in a case where the image transfer fails in the manual image transfer processing. Note that, in the present processing, the processing from the step S700 to the step S706 in the present processing is similar to the operations illustrated in FIG. 7, and the control unit 103 executes each of the steps S700 to S706 to perform transfer (of the designated image) to the external apparatus 200.

At a step S801, the control unit 103 determines whether the image transfer has failed. The control unit 103 determines that the image transfer has failed in a case where the Wi-Fi (trademark) communication between the control unit 103 and the external apparatus 200 is disconnected. In a case of determining that the image transmission has failed based on the notification from the communication unit 107, the control unit 103 proceeds to a step S802, and otherwise returns to the step S801. Note that, in a case where the image transmission successfully ends instead of failing at the step S801, the transfer state may be set to "transfer complete", and the present sequence of processing may be ended.

At the step S802, the control unit 103 determines whether a set value for the automatic image transfer function in the power OFF state is enabled. In a case where the function is enabled, the control unit 103 proceeds to a step S803, and otherwise proceeds to a step S804. At the step S804, the control unit 103 changes the forwarded state of the designated image in the transfer management list to "transfer failure" and then terminates the present sequence of processing. At the step S803, the control unit 103 changes the transferred state of the designated image in the transfer management list to the "transfer reserved" state, and ends the present sequence of operations. In other words, in a case of using the automatic image transfer function, the control unit 103 controls the transfer state to make the image with failed Wi-Fi transfer the object of retransmission by BLT. This enables the image with the failed Wi-Fi (trademark) transfer to be transferred by Bluetooth (trademark) in a case where the automatic image transfer function is executed at the time of the next power OFF.

First Additional Processing in Automatic Image Transfer Processing

Figure 9:
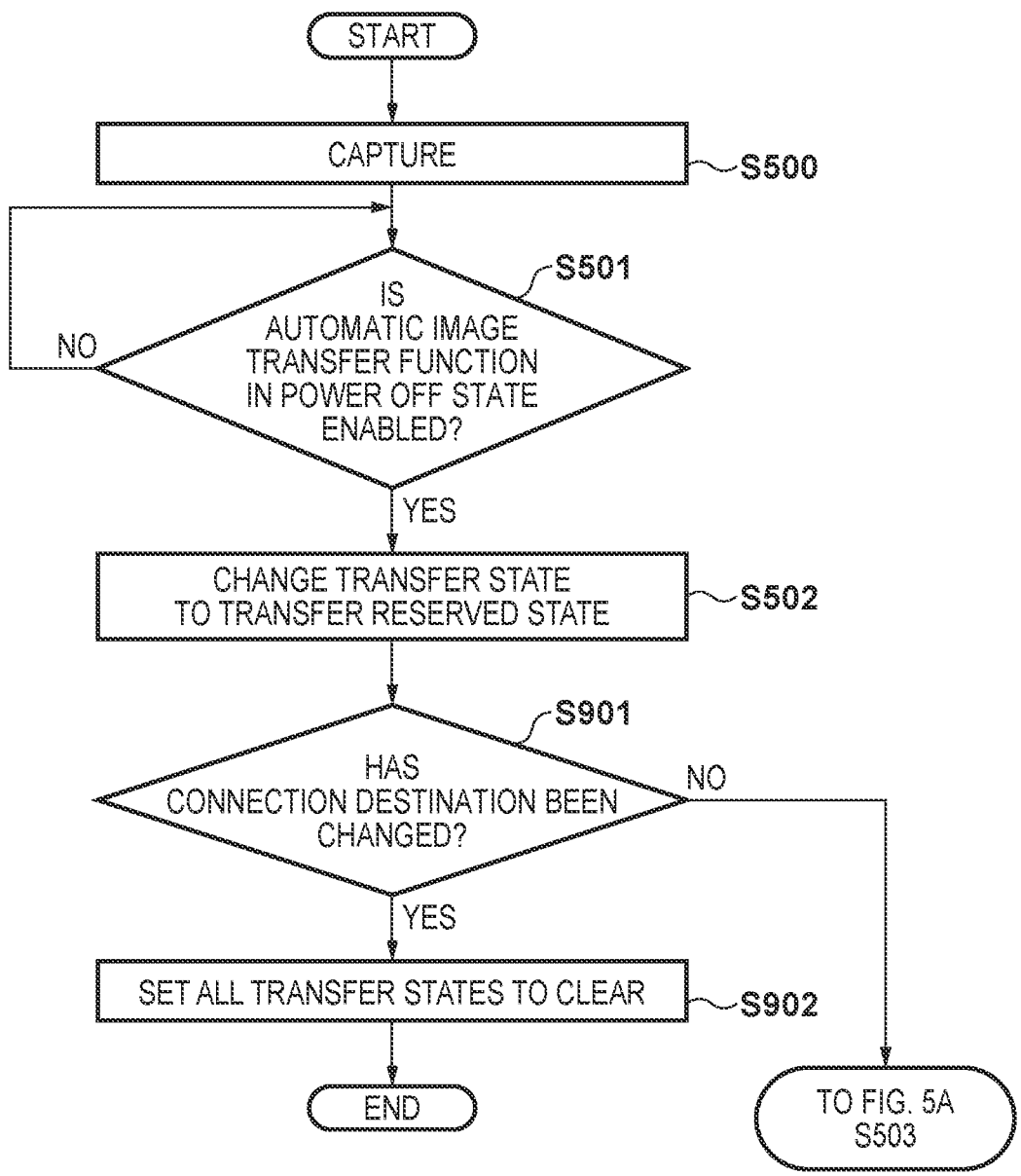
FIG. 9 is a flowchart illustrating operations performed in a case where a transfer partner is switched in the automatic image transfer processing.

In the above-described image, as an example, the communication partner apparatus is the same external apparatus 200. However, the communication partner apparatus may be switched in a case where time elapses, and thus with the transfer state of the image in the transfer management list remaining the "transfer reserved" state, the image may be unintentionally transferred to the communication partner apparatus. Additional processing for preventing such an operation (that is, additional processing in view of switching of the communication partner apparatus) will be described with reference to FIG. 9.

First, the control unit 103 performs the processing from the step S500 to the step S502 in the automatic image transfer processing illustrated in FIG. 5A to capture an image and change the transfer state of the captured image in the transfer management list to the "transfer reserved" state.

At a step S901, the control unit 103 determines whether the external apparatus, corresponding to the connection destination, has been changed. The control unit 103 determines that the external apparatus, corresponding to the connection target, has been changed, for example, in a case where the pairing partner is switched from the apparatus paired with the digital camera 10 by Bluetooth (registered trademark) to another apparatus. In a case of determining that the external apparatus, corresponding to the connection destination, has been changed, the control unit 103 proceeds to a step S902, and otherwise proceeds to the step S503 illustrated in FIG. 5A.

At the step S902, the control unit 103 sets all of the transfer states in the transfer management list to the initial value and ends the sequence of operations of the automatic image transfer processing. With this processing executed, in a case where the external apparatus, corresponding to the connection destination, is switched, the image can be prevented from being unintentionally transferred to the different connection destination.

Second Additional Processing in Automatic Image Transfer Processing

Now, second additional processing in the automatic image transfer processing will be described with reference to FIG.

Figure 10:
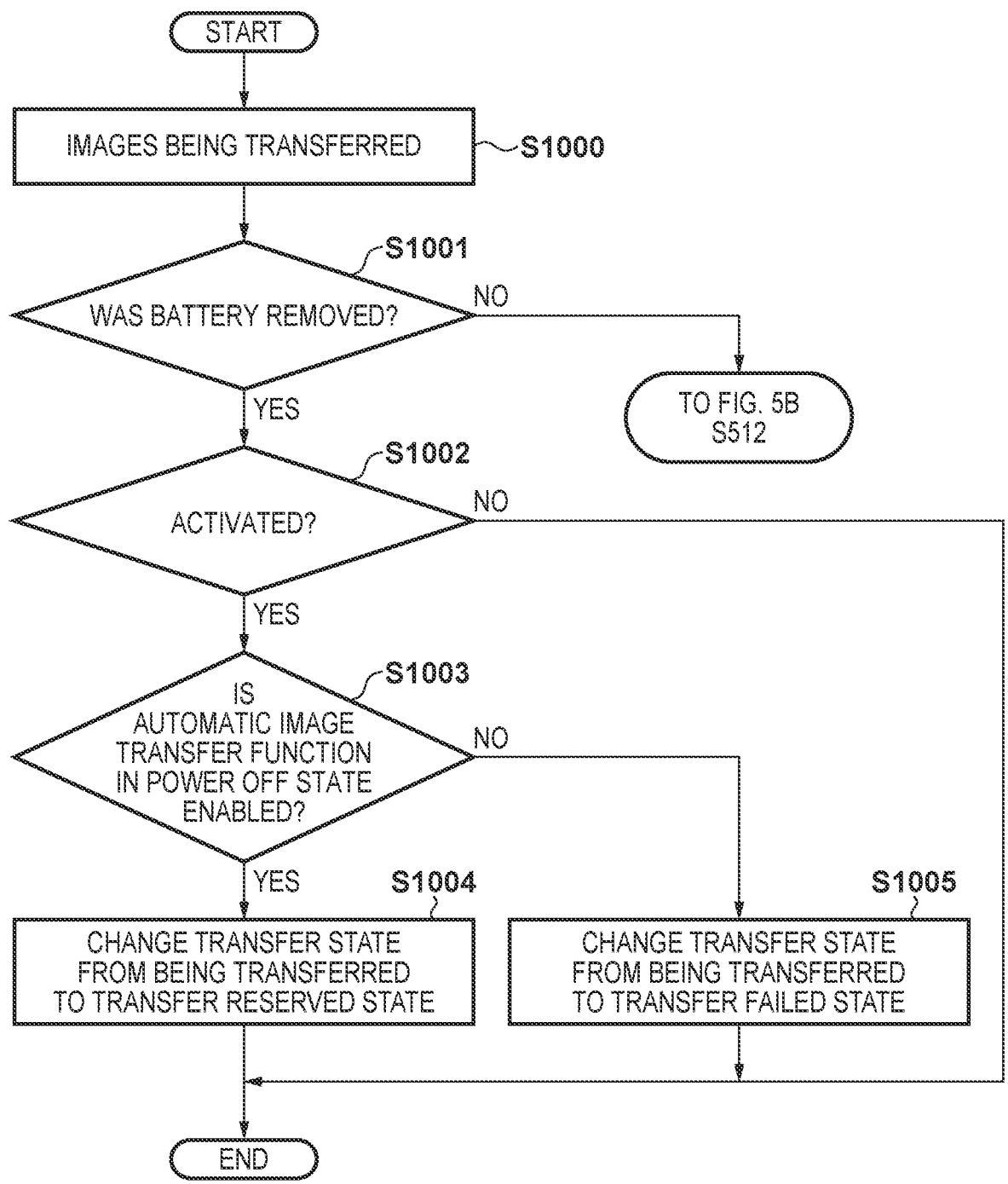
FIG. 10 is a flowchart illustrating operations performed in the automatic image transfer processing in a case where the digital camera shuts down in an unanticipated situation during image transfer.

10. During image transfer, an unanticipated situation may occur to bring the power supply for the digital camera 10 into a shutdown state, suspending the image transfer. In a case where the shutdown state causes the transfer to be suspended, the control unit 103 has no time to change the transfer state in the transfer management list, and thus the transfer state in the list may remain the "image being transferred" state. In a case where the transfer state for the captured image remains "image being transferred," then the data is not the object of transfer after the digital camera 10 is activated next time. Thus, even in a case where the user powers OFF the digital camera 10 in expectation of the automatic image transfer processing in the power OFF state, the control unit 103 does not start image transfer. Thus, in the present embodiment, by performing the additional processing illustrated in FIG. 10, operations can be avoided in which the image transfer is not started. Note that the processing illustrated in FIG. 10 is started from a point where the operation at the step S511 (image transfer) illustrated in FIG. 5B is performed. Specifically, at a step S1000, the control unit 103 is transferring the image to the external apparatus 200.

In a case where power supply from a power supply unit not illustrated is stopped during image transfer (for example, a battery included in the power supply unit is removed), power supply to the digital camera 10 is stopped to bring the digital camera 10 into the shutdown state. At a step S1001, in a case where no battery is removed, the control unit 103 proceeds to the step S512 illustrated in FIG. 5B and executes the processing illustrated in FIG. 5B. On the other hand, in a case where the battery is removed, at a timing when power is supplied again to activate the digital camera 10, the control unit 103 determines at a step S1002 whether the digital camera 10 has been activated. The control unit 103 determines that the digital camera 10 has been activated in a case where, for example, a process of reactivation is executed. In a case where the digital camera 10 is not reactivated, the present sequence of processing ends.

At a step S1003, the control unit 103 determines whether the setting for the automatic image transfer function in the power OFF state is enabled. In a case where the setting for the function is disabled, the control unit 103 proceeds to a step S1005, and otherwise proceeds to a step S1004. At the step S1005, the control unit 103 changes the transfer state of the image in the transfer management list from the "image being transferred" state to the "transfer failed" state. On the other hand, in a case where the automatic image transfer function is enabled, then at the step S1004, the control unit 103 changes the transfer state in the transfer management list from the "image being transferred" state to the "transfer reserved" state.

Execution of such processing can solve the problem in which, in a case where, during image transfer, an unanticipated situation occurs to bring the power supply into the shutdown state, the transfer state of the image in the transfer management list remains the "image being transferred" state, preventing the transmission of the image. In other words, execution of the above-described processing can prevent a situation where, after the digital camera 10 is activated, the image transfer is not started even though the digital camera 10 is powered OFF in expectation of the automatic image transfer function in the power supply OFF.

Note that in the operation illustrated in FIG. 10, the control unit 103 may reference the transfer management list in a case where the digital camera 10 is activated. Specifically, in a case where, during activation, the transfer state of any image in the transfer management list is "image being transferred," the control unit 103 can determine that an unanticipated situation has occurred during the image transfer. For example, in a case where, during activation, the transfer state in the transfer management list is the "image being transferred" state and the setting for the automatic image transfer function is enabled, the control unit 103 may change the transfer state from the "image being transferred" state to the "transfer reserved" state. On the other hand, in a case where the transfer state in the transfer management list is the "image being transferred" state and the setting for the automatic image transfer function is disabled, the control unit 103 may change the transfer state from the "image being transferred" state to the "transfer failed" state.

As described above, in the present embodiment, in a case where the manual image transfer by the Wi-Fi communication is successful, the transfer state is set to "transfer complete" to prevent the next transferred data from being the object of transmission. On the other hand, with failed image transfer, the transfer state is set to "transfer failed" to prevent the transferred data from being the object of transmission in a case where the setting is disabled in which the image is automatically transferred by the BLT communication at the time of occurrence of a predetermined event (for example, power OFF) in the digital camera 10. On the other hand, in a case where the setting for the automatic transfer of the image by the BLT communication is enabled, the transfer state is controlled to the "transfer reserved" state to make the transferred data the object of transmission in spite of failed image transfer. In this way, control can be performed to automatically transfer the image by the BLT communication even in a case where the manual image transfer in the Wi-Fi communication has failed. In other words, even in a case where the transfer of predetermined data using one transfer method has failed, the predetermined data can be more reliably transferred to the external apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-085791, filed Apr. 26, 2019, which is hereby incorporated by reference herein in its entirety.

What is claimed is:

1. A communication apparatus comprising:
a first communication circuit configured to transfer data to an external apparatus using a first communication method;
a second communication circuit configured to transfer data to the external apparatus using a second communication method;
one or more processors; and
a memory storing instructions which, when the instructions are executed by the one or more processors, cause the communication apparatus to function as:
a setting unit configured to set enabling or disabling of data transfer using the second communication circuit; and
a control unit configured to manage a transfer state of each data to be transferred and to control the transfer of the data to be transferred using the first communication circuit and the transfer of the data to be transferred using the second communication circuit,
wherein the control unit controls to prevent the data to be transferred from being an object of subsequent data transfer in a case where the transfer of the data to be transferred using the first communication circuit is successful, and
in a case where the transfer of data to be transferred using the first communication circuit fails,
the control unit controls to prevent the data to be transferred from being an object of data transfer using the second communication circuit in a case where the data transfer using the second communication circuit is disabled, and
the control unit controls to make the data to be transferred the object of data transfer using the second communication circuit in a case where the data transfer using the second communication circuit is enabled.

2. The communication apparatus according to claim 1, wherein, in a case of failing in the transfer of the data to be transferred using the first communication circuit,
the control unit controls the transfer state of the data to be transferred to a first state in which the data to be transferred is not the object of the data transfer using the second communication circuit in a case where the data transfer using the second communication circuit is disabled, and
the control unit controls the transfer state of the data to be transferred to a second state in which the data to be transferred is the object of the data transfer using the second communication circuit in a case where the data transfer using the second communication circuit is enabled.

3. The communication apparatus according to claim 2, wherein the control unit controls the transfer state of the data to be transferred to a state in which the data to be transferred is not the object of the subsequent data transfer in a case where the transfer of the data to be transferred using the second communication circuit is successful, and
the control unit controls the transfer state of the data to be transferred to the second state in a case where the transfer of the data to be transferred using the second communication circuit fails.

4. The communication apparatus according to claim 1, wherein, in response to receipt of a user operation, the control unit controls to transfer the data to the external apparatus using the first communication circuit, and
in response to occurrence of a predetermined event in the communication apparatus, the control unit controls to transfer the data to the external apparatus using the second communication circuit.

5. The communication apparatus according to claim 4, wherein, in a case where the transfer of the data using the second communication circuit is enabled, the control unit controls, in response to switching of the external apparatus connected using the second communication circuit, to prevent the data to be transferred from being the object of the data transfer using the second communication circuit.

6. The communication apparatus according to claim 4, wherein, in a case where the transfer of the data to be transferred is suspended, the control unit controls to make the data to be transferred the object of the data transfer using the second communication circuit in a case where the data transfer using the second communication circuit is enabled.

7. The communication apparatus according to claim 1, wherein the first communication method is a communication method enabling faster communication than the second communication method and the second communication method is a communication method enabling more power-saving communication than the first communication method.

8. The communication apparatus according to claim 1, further comprising an image sensor;
wherein the data to be transferred includes image data captured by the image sensor.

9. A method of controlling a communication apparatus that comprises a first communication circuit configured to transfer data to an external apparatus using a first communication method, and a second communication circuit configured to transfer data to the external apparatus using a second communication method, the method comprising:
setting enabling or disabling of data transfer using the second communication circuit; and
controlling to manage a transfer state of each data to be transferred and to control the transfer of the data to be transferred using the first communication circuit and the transfer of the data to be transferred using the second communication circuit,
wherein the controlling includes controlling to prevent the data to be transferred from being an object of subsequent data transfer in a case where the transfer of the data to be transferred using the first communication circuit is successful, and
in a case where the transfer of data to be transferred using the first communication circuit fails,
controlling to prevent the data to be transferred from being an object of data transfer using the second communication circuit in a case where the data transfer using the second communication circuit is disabled, and
controlling to make the data to be transferred the object of data transfer using the second communication circuit in a case where the data transfer using the second communication circuit is enabled.

10. The method according to claim 9, wherein the controlling includes, in a case of failing in the transfer of the data to be transferred using the first communication circuit, controlling the transfer state of the data to be transferred to a first state in which the data to be transferred is not the object of the data transfer using the second communication circuit in a case where the data transfer using the second communication circuit is disabled, and controlling the transfer state of the data to be transferred to a second state in which the data to be transferred is the object of the data transfer using the second communication circuit in a case where the data transfer using the second communication circuit is enabled.

11. The method according to claim 10, wherein the controlling includes controlling the transfer state of the data to be transferred to a state in which the data to be transferred is not the object of the subsequent data transfer in a case where the transfer of the data to be transferred using the second communication circuit is successful, and controlling the transfer state of the data to be transferred to the second state in a case where the transfer of the data to be transferred using the second communication circuit fails.

12. The method according to claim 9, wherein the controlling includes, in response to receipt of a user operation, controlling to transfer the data to the external apparatus using the first communication circuit, and in response to occurrence of a predetermined event in the communication apparatus, controlling to transfer the data to the external apparatus using the second communication circuit.

13. The method according to claim 12, wherein the controlling includes, in a case where the transfer of the data using the second communication circuit is enabled, controlling, in response to switching of the external apparatus connected using the second communication circuit, to prevent the data to be transferred from being the object of the data transfer using the second communication circuit.

14. The method according to claim 12, wherein the controlling includes, in a case where the transfer of the data to be transferred is suspended, making the data to be transferred the object of the data transfer using the second communication circuit in a case where the data transfer using the second communication circuit is enabled.

15. The method according to claim 9, wherein the first communication method is a communication method enabling faster communication than the second communication method and the second communication method is a communication method enabling more power-saving communication than the first communication method.

16. The method according to claim 9, wherein the communication apparatus comprises an image sensor, and the data to be transferred includes image data captured by the image sensor.

17. A non-transitory computer-readable storage medium storing instructions which, when the instructions are executed by one or more processors of a communication apparatus that comprises a first communication circuit configured to transfer data to an external apparatus using a first communication method, and a second communication circuit configured to transfer data to the external apparatus using a second communication method, cause the communication apparatus to perform:

setting enabling or disabling of data transfer using the second communication circuit; and controlling to manage a transfer state of each data to be transferred and to control the transfer of the data to be transferred using the first communication circuit and the transfer of the data to be transferred using the second communication circuit, wherein the controlling includes controlling to prevent the data to be transferred from being an object of subsequent data transfer in a case where the transfer of the data to be transferred using the first communication circuit is successful, and in a case where the transfer of data to be transferred using the first communication circuit fails, controlling to prevent the data to be transferred from being an object of data transfer using the second communication circuit in a case where the data transfer using the second communication circuit is disabled, and controlling to make the data to be transferred the object of data transfer using the second communication circuit in a case where the data transfer using the second communication circuit is enabled.

* * * * *